No. 778,838. PATENTED JAN. 3, 1905.
R. C. BELK.
REVERSIBLE DISK PLOW.
APPLICATION FILED JUNE 29, 1904.
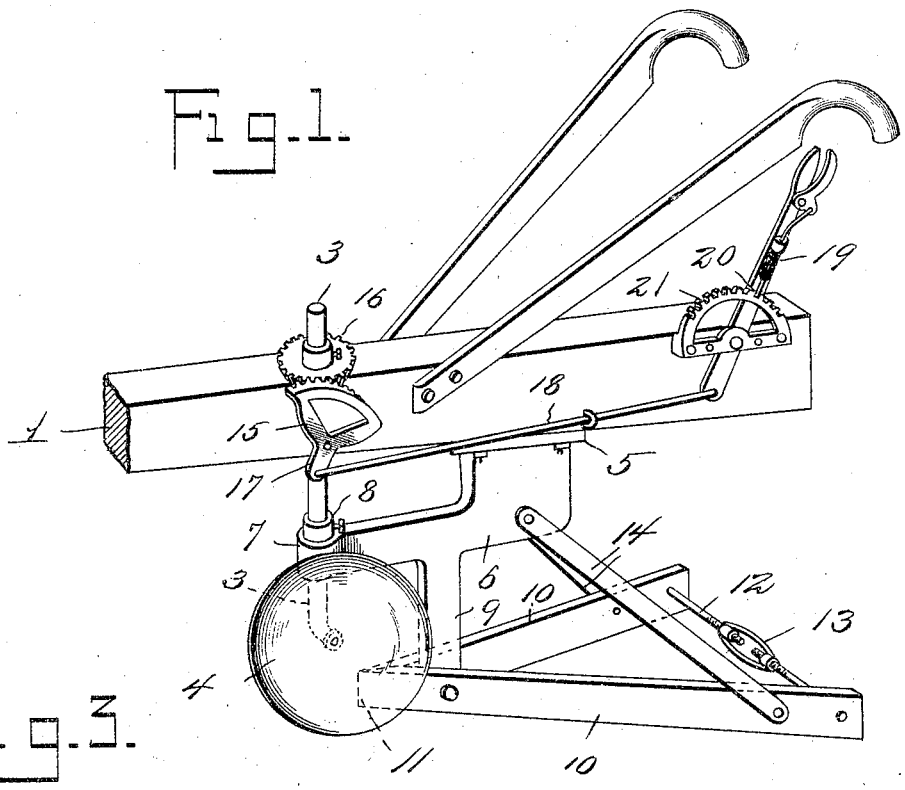
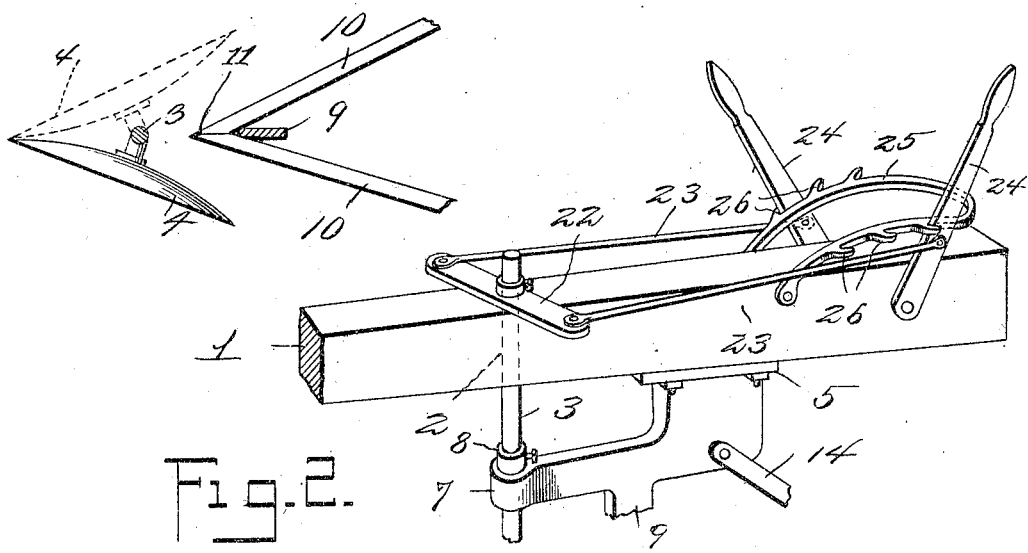
Witnesses
E. T. Stewart
Wm. Bagger
Robert C. Belk,
Inventor,
by C. A. Snow & Co.
Attorneys No. 778,838.

Patented January 3, 1905.

UNITED STATES PATENT OFFICE.

ROBERT C. BELK, OF MOUNT HOLLY, NORTH CAROLINA.

REVERSIBLE-DISK PLOW.

SPECIFICATION forming part of Letters Patent No. 778,838, dated January 3, 1905.

Application filed June 29, 1904. Serial No. 214,659.

*To all whom it may concern:*

Be it known that I, ROBERT C. BELK, a citizen of the United States, residing at Mount Holly, in the county of Gaston and State of North Carolina, have invented a new and useful Reversible-Disk Plow, of which the following is a specification.

This invention relates to plows, and especially to disk plows, and it has particular reference to single-disk plows which are directed by the operator walking behind the plows, the object of the invention being to facilitate the turning of the disk at the end of each row in order that the sod may be turned in the desired direction.

The invention consists in improved supporting means for the shaft upon which the disk plow is mounted.

The invention further consists in improved means, in the nature of an adjustable landside, to assist in supporting the plow-disk at the desired adjustment.

With these and other ends in view the invention further consists in the improved construction and novel arrangement and combination of parts, which will be hereinafter fully described, and particularly pointed out in the claims.

The accompanying drawings illustrate simple and preferred forms of the invention, it being, however, understood that no limitation is necessarily made to the precise structural details therein exhibited, the right being reserved to any changes, alterations, and modifications to which recourse may be had without departing from the spirit or sacrificing the advantages of the same.

In said drawings, Figure 1 is a perspective view of a walking disk plow constructed in accordance with the principles of the invention. Fig. 2 is a perspective view illustrating modified means for reversing the disk-carrying shaft. Fig. 3 is a detail plan view showing the landside, the disk, and related parts.

Corresponding parts in the several figures are indicated by similar characters of reference.

In carrying out the invention a plow-beam 1 is provided, having a vertical perforation 2 for the passage of a stem or shaft 3, carrying at its lower end a plow-disk 4, which is of ordinary well-known construction. To the under side of the beam is secured a plate or casting 5, having a downwardly and forwardly extending bracket 6, terminating at its front end in a bearing 7 for the disk-carrying shaft 3, which is thereby securely supported upon and connected with the plow-beam. Any suitable means, such as a collar 8 upon the stem 3, may be employed to retain said stem or shaft at the desired elevation. The front end of the bracket 6 is provided with a downwardly-extending foot 9, with the lower end of which are connected rearwardly-diverging blades 10 10, which converge at the front to form a cutting edge 11. The blades 10 are provided near their rear ends with inwardly-extending bolts or threaded members 12, connected by a turnbuckle 13, whereby the said blades may be spaced at various distances apart at their rear ends. Additional support for said blades 10 is afforded by resilient arms or members 14, which connect said blades with the rear portion of the brackets 6.

For the purpose of adjusting the plow-disk and retaining it at various adjustments several means may be resorted to, two of which have been illustrated, respectively, in Figs. 1 and 2 of the drawings. In Fig. 1 there is connected pivotally with the said plow-beam a segmental rack 15, the teeth of which are beveled to mesh with the teeth of a bevel-pinion 16, secured upon the stem or shaft 3 above the plow-beam. The segment-rack 15 has a downwardly-extending arm 17, which is connected, by means of a suitably-supported sliding rod 18, with an operating-lever 19, having a spring-actuated dog or pawl 20 adapted to engage a segment-rack 21, whereby the parts may be retained at any desired adjustment. It is obvious that by manipulating the lever 18 the rack-segment 15 may be operated to turn the pinion connected with the stem or shaft 3, thereby turning the latter in its bearings, causing the disk to turn the furrow-slice either to the right or to the left, as may be required. The blades 10 10 being adjustable by means of the turnbuckle 13, it is obvious that the plow-disk 4 may be placed at various angles to turn a furrow-slice of any desired width, the blades 10 10, which constitute scrapers, being adjusted and properly spaced apart at their rear ends, so as to square the bottom of the furrow. The plow will be supported in any desired position by means of the dog or pawl 20 upon the lever 19 engaging the rack-segment 21.

Under the modification illustrated in Fig. 2 the stem or shaft 3 is provided at its upper end with a cross-bar 22, extending slightly beyond the sides of the plow-beam, the ends of said cross-bar being connected directly by means of rods 23 with a pair of levers 24, one of which is pivoted to each side of the beam. Secured upon the upper side of the latter is a rack 25, provided on each side thereof with rearwardly-facing teeth 26, which said teeth extend beyond the sides of the beam sufficiently to be engaged by the levers 24, which possess sufficient resiliency to spring readily into engagement with the said teeth. In order to shift the position of the plow-disk, it is only necessary to disengage the lever 24, which at the time is in engagement with one of the rearmost teeth 26 at one side of the beam. Said lever is then carried forward, it being meanwhile held out of engagement with the teeth, thus pushing upon one end or arm of the cross-piece 22 and causing the plow-carrying stem to turn upon its axis, the opposite lever 24 meanwhile sliding over rearwardly-inclined teeth 26, constituting a catch which prevents reverse movement after the desired point of adjustment has been attained. It will thus be seen that while two operating-levers are provided only one of said levers is required to be operated in order to cause the desired adjustment to be effected.

From the foregoing description, taken in connection with the drawings hereto annexed, the operation and advantages of this invention will be readily understood.

By the construction of the bracket herein described a secure bearing is provided for the disk-carrying stem or shaft.

The various adjustments of which the plow is capable will enable it to operate successfully in soil of various kinds and conditions, making the furrows as deep and wide as circumstances will permit.

Having thus described the invention, what is claimed is—

1. In a reversible-disk plow, a beam having a perforation, a bracket connected with said beam and having a bearing in alinement with said perforation, a disk-carrying beam journaled in said bracket and perforation, a foot extending downwardly from the bracket, rearwardly-diverging blades secured to said foot, and means for adjusting the disk-carrying stem.

2. In a reversible-disk plow, a plow-beam, a bracket secured to the under side of said beam and having a bearing, a disk-carrying stem journaled in said bearing, a foot extending downwardly from the bracket, rearwardly-diverging plates secured to said foot, and means for adjusting the disk-carrying stem and for retaining it at various adjustments.

3. In a reversible-disk plow, a plow-beam, a bracket secured to the under side of said beam and terminating in a bearing at its front end, a disk-carrying stem journaled in said bearing, a foot depending from the bracket, rearwardly-diverging scraper-blades connected with said foot, threaded members extended inwardly from the scraper-blades near the rear ends of the latter, a turnbuckle connecting said threaded members for the adjustment of the scraper-blades, and means for axially rotating the disk-carrying stem.

4. In a device of the class described, a plow-beam, a bracket secured to the under side of said beam and terminating in a bearing at its front end, a disk-carrying shaft journaled in said bearing, a foot depending from the bracket, scraper-blades connected with said foot and diverging rearwardly, means for adjustably connecting and spacing apart the rear ends of said scraper-blades and resilient arms connecting the latter with the bracket upon the under side of the plow-beam.

5. In a reversible-disk plow, the combination with a plow-beam, of a suitably-journaled stem, a plow-disk mounted for rotation upon said stem, a foot, rearwardly-diverging scraper-blades connected with said foot, spring-arms connecting said scraper-blades with a supporting-point and means for turning the disk-carrying stem in its bearings.

6. In a reversible-disk plow, a beam having a bracket provided with a bearing, a disk-carrying stem journaled in said bearing, a foot depending from the bracket, rearwardly-diverging scraper-blades connected with said foot, means for adjusting the rear ends of the scraper-blades at various distances apart and for retaining them at such adjustment.

7. In a reversible-disk plow, a plow-beam, a bracket depending from the same and having a bearing at its front end, a disk-carrying stem journaled in said bearing, a foot depending from the bracket, rearwardly-extending scraper-blades connected with the foot, means for adjustably connecting and spacing apart the rear ends of the scraper-blades, resilient arms connecting said scraper-blades independently with a fixed supporting-point, and means for rotating the disk-carrying stem in its bearing and for retaining it at various adjustments.

8. In a reversible-disk plow, the combination of a plow-beam, a bracket secured to the under side of said beam and having a bearing, a disk-carrying stem extending through said bearing and upwardly through a perforation in the plow-beam, a cross-brace at the upper end of said stem, a pair of resilient levers fulcrumed to opposite sides of the plow-beam, rods connecting said levers with the extremities of the cross-brace at the upper ends of the disk-carrying stem, and a toothed segment connected with the beam and having, at each side thereof, rearwardly-inclined teeth, extending beyond the planes of the side of the beam for ready engagement with the operating-levers.

In testimony that I claim the foregoing as my own I have hereto affixed my signature in the presence of two witnesses.

ROBERT C. BELK.

Witnesses:
J. A. COSTUN,
A. P. RHYNE.